(12) United States Patent  
Lieberman et al.

(10) Patent No.: US 7,333,095 B1
(45) Date of Patent: Feb. 19, 2008

(54) ILLUMINATION FOR OPTICAL TOUCH PANEL

(75) Inventors: Klony Lieberman, Jerusalem (IL); Yuval Sharon, Kochav Hashachar (IL); Yossi Chai, Tel Aviv (IL)

(73) Assignee: Lumio Inc, Menlo Park ( * ) Notice: Subject to any disclaimer, the term of this patent is extended or adjusted under 35 U.S.C. 154(b) by 0 days.

(21) Appl. No.: 11/776,563

(22) Filed: Jul. 12, 2007

Related U.S. Application Data

(60) Provisional application No. 60/889,746, filed on Feb. 14, 2007, provisional application No. 60/827,223, filed on Sep. 28, 2006, provisional application No. 60/832,508, filed on Jul. 24, 2006, provisional application No. 60/819,891, filed on Jul. 12, 2006.

(51) Int. Cl.
*G09G 5/00* (2006.01)

(52) U.S. Cl. .................. 345/176; 178/18.09

(58) Field of Classification Search ......... 345/173–181
See application file for complete search history.

(56) References Cited

U.S. PATENT DOCUMENTS

| | | | |
|---|---|---|---|
| 5,257,340 A | 10/1993 | Kaplan | |
| 5,295,047 A | 3/1994 | Windross | |
| 5,905,583 A | 5/1999 | Kawai et al. | |
| 6,664,489 B2* | 12/2003 | Kleinhans et al. | 200/313 |
| 6,783,269 B2 | 8/2004 | Pashley et al. | |
| 6,972,401 B2 | 12/2005 | Akitt et al. | |
| 7,099,553 B1* | 8/2006 | Graham et al. | 385/146 |
| 7,105,678 B2* | 9/2006 | Meltzer et al. | 546/132 |
| 7,163,326 B2* | 1/2007 | Cassarly et al. | 362/551 |
| 2005/0128190 A1* | 6/2005 | Ryynanen | 345/173 |
| 2005/0248540 A1 | 11/2005 | Newton | |

* cited by examiner

*Primary Examiner*—Duc Q Dinh

(57) ABSTRACT

An optical touch panel including a support defining a generally planar surface, an optical illumination assembly arranged along and above at least part of a periphery of the support to define a detection region, at least one light detector, arranged to detect changes in the light received from the optical illumination assembly produced by the presence of an object in the detection region and detection circuitry receiving at least one output from the at least one light detector and providing an output indication of the two dimensional location of object impingement in the detection region.

18 Claims, 4 Drawing Sheets

ILLUMINATION FOR OPTICAL TOUCH PANEL

REFERENCE TO RELATED APPLICATIONS

Reference is made to U.S. Provisional Patent Application Ser. No. 60/827,223, filed Sep. 28, 2006 and entitled OPTICAL SENSING SYSTEM, the disclosure of which is hereby incorporated by reference and priority of which is hereby claimed pursuant to 37 CFR 1.78(a) (4) and (5)(i).

Reference is made to U.S. Provisional Patent Application Ser. No. 60/819,891, filed Jul. 12, 2006 and entitled "LOW PROFILE TRIANGULATION AND SYSTEMS CALIBRATION METHOD," the disclosure of which is hereby incorporated by reference.

Reference is made to U.S. Provisional Patent Application Ser. No. 60/832,508, filed Jul. 24, 2006 and entitled "ACCUMULATOR BASED TRIANGULATION FOR TRACKING MULTIPLE EVENTS," the disclosure of which is hereby incorporated by reference.

Reference is made to U.S. Provisional Patent Application Ser. No. 60/889,746, filed Feb. 14, 2007 and entitled "TRIANGULATION WITH ENHANCED RESOLUTION," the disclosure of which is hereby incorporated by reference.

Reference is made to U.S. patent application Ser. No. 11/691,508, filed Mar. 27, 2007 and entitled OPTICAL SYSTEM, the disclosure of which is hereby incorporated by reference.

Reference is made to U.S. patent application Ser. No. 11/691,510, filed Mar. 27, 2007 and entitled OPTICAL TOUCH SCREEN, the disclosure of which is hereby incorporated by reference.

FIELD OF THE INVENTION

The present invention relates generally to optical touch panels and optical assemblies useful therein.

BACKGROUND OF THE INVENTION

The following U.S. patent publications are believed to represent the current state of the art: U.S. Pat. Nos. 7,099,553; 6,972,401; 6,783,269; 5,257,340; 5,905,583 and 5,295,047, and U.S. Published Patent Application 2005/0248540.

SUMMARY OF THE INVENTION

The present invention seeks to provide an improved optical touch panel.

There is thus provided in accordance with a preferred embodiment of the present invention an optical touch panel including a support defining a generally planar surface, an optical illumination assembly arranged along and above at least part of a periphery of the support to define a detection region, the assembly including at least one light guide, the at least one light guide having at least one light scatterer, the at least one light guide having optical power at least one surface having a focus located in proximity to the light scatterer and at least one light source arranged for directing light along the at least one light guide, the optical power of the at least one light guide and the at least one light scatterer being operative to direct light, received from the at least one light source along the at least one light guide and scattered by the at least one light scatterer, generally in a plane parallel to the generally planar surface, at least one light detector, arranged to detect changes in the light received from the optical illumination assembly produced by the presence of an object in the detection region and detection circuitry receiving at least one output from the at least one light detector and providing an output indication of the two dimensional location of object impingement in the detection region.

Preferably, the at least one light guide extends along at least most of a periphery of a light curtain area parallel to the generally planer surface and the at least one light scatterer extends along the periphery of the light curtain area, providing a generally uniform distribution of light in the plane, filling the interior of the periphery of the light curtain area and thereby defining a light curtain therewithin. Additionally, the optical touch panel also may include at least one light curtain impingement sensor operative to sense impingement of the light curtain and to produce impingement output signals including two-dimensional impingement location information and output signal processing circuitry for providing an output indication of a two-dimensional impingement location.

Preferably, the at least one light guide includes a single light guide and the at least one light source includes two light sources, a single light source being placed at each end of the single light guide. Additionally or alternatively, the at least one light source is located only at a corner of the periphery of the detection region.

Preferably, light scattering functionality of the at least one light scatterer varies along the length of the at least one light guide to provide compensation for attenuation produced by the light guide.

Preferably the detection circuitry operates at least partially by triangulation.

Preferably, the at least one light guide extends along three sides of the detection region, the at least one detector includes a pair of detectors located at adjacent corners of the detection region alongside ends of the at least one light guide and wherein the detection circuitry operates at least partially by triangulation.

Preferably, the at least one light guide has a non-spherical cross section and the at least one light scatterer is located precisely at a focus of the at least one surface. Additionally, the non-spherical cross section may include a curved forward portion having optical power. Additionally, the non-spherical cross section may include generally parallel intermediate portions. Additionally, the non-spherical cross section may include tapering rearward portions which meet at a relatively narrow rearward strip portion.

Preferably, the optical touch panel also includes an elongate transparent mounting and window defining guide fixed to the support, the elongate transparent mounting and window defining guide having a U-shaped cross section comprising parallel surfaces and wherein the parallel surfaces engage the generally parallel intermediate portions.

Preferably, the at least one light scatterer includes a layer of light scattering paint.

Preferably, the optical touch panel also includes an elongate transparent mounting and window defining guide fixed to the support. Additionally, the elongate transparent mounting and window defining guide may be operative to ensure correct alignment of the optical illumination assembly relative to the support. Additionally or alternatively, the elongate transparent mounting and window defining guide has a U-shaped cross section. Additionally or alternatively, the elongate transparent mounting and window defining guide is operative to minimize light loss from the at least one light guide.

BRIEF DESCRIPTION OF THE DRAWINGS

The present invention will be understood and appreciated more fully from the following detailed description, taken in conjunction with the drawings in which.

DETAILED DESCRIPTION OF PREFERRED EMBODIMENTS

Figure 1:
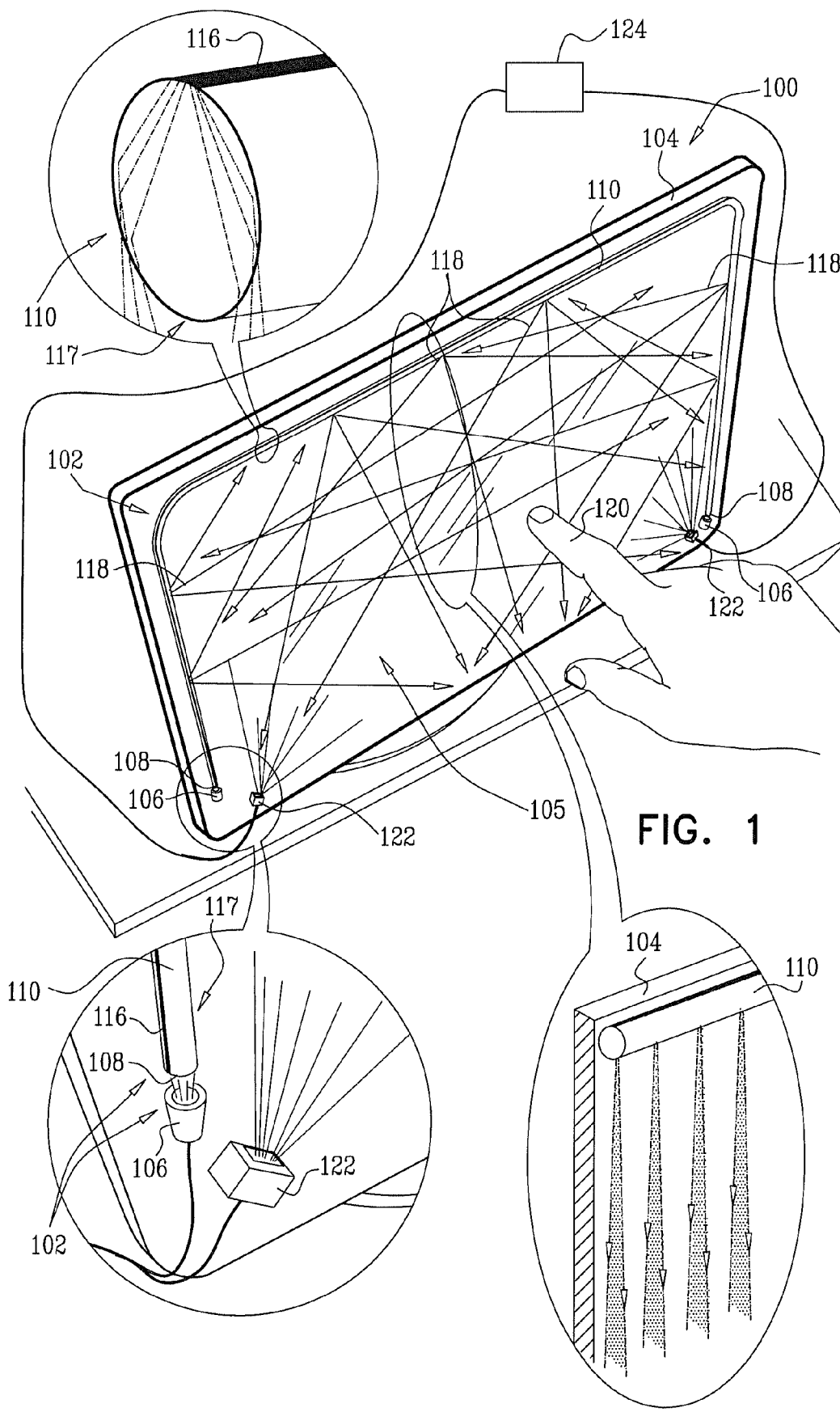
FIG. 1 is a simplified illustration of a touch screen constructed and operative in accordance with a preferred embodiment of the present invention.

Reference is now made to FIG. 1, which illustrates an optical touch screen 100, constructed and operative in accordance with a preferred embodiment of the present invention. As seen in FIG. 1, the touch screen 100 comprises an optical illumination assembly 102 which is preferably arranged along and above all or part of the periphery of a support 104, typically a glass plate. Alternatively, the glass plate may be obviated and the support 104 may be a frame (not shown). Typically, the optical illumination assembly 102 extends along three of four edges of a generally planar detection region 105.

In accordance with a preferred embodiment of the present invention, the optical illumination assembly 102 receives illumination from light sources 106, such as an LED or a diode laser, and preferably an infrared laser or LED, disposed at each end 108 of assembly 102. Alternatively, a single light source 106 may be employed, disposed at one end 108 of the assembly 102. As seen in FIG. 1, light sources 106 are preferably located at a corner of the periphery of the generally planar detection region 105.

In accordance with a preferred embodiment of the present invention, the optical illumination assembly 102 comprises at least one light guide 110, such as a plastic rod, which preferably has at least one light scatterer 116 at least one location therealong, preferably opposite at least one light transmissive region 117 of the light guide 110, at which region 117 the light guide 110 has optical power. A surface of light guide 110 at transmissive region 117 preferably has a focus located in proximity to light scatterer 116.

In the illustrated embodiment, light scatterer 116 is preferably defined by a narrow strip of white paint extending along the plastic rod along at least a substantial portion of the entire length of the optical illumination assembly 102.

In accordance with a preferred embodiment of the present invention, the at least one light scatterer 116 is operative to scatter light which is received from the light source 106 and passes along the at least one light guide 110. The optical power of the light guide 110 at the at least one light transmissive region 117 collimates and directs the scattered light in a direction generally away from the scatterer 116, as indicated generally by reference numeral 118. It is appreciated that generally every location in generally planar detection region 105 receives light generally from every location along the at least one light transmissive region 117.

In accordance with a preferred embodiment of the present invention, the at least one light guide 110 extends generally continuously along a periphery of a light curtain area defined by the detection region 105 and the at least one light scatterer 116 extends generally continuously along the periphery, directing light generally in a plane, filling the interior of the periphery and thereby defining a light curtain therewithin.

In an alternative embodiment, the at least one light guide 110 extends along a periphery of a light curtain area defined by the detection region 105 and the at least one light scatterer 116 includes a plurality of separate light scatterers distributed along the periphery, whereby the plurality of light scatterers direct light generally in a plane, filling the interior of the periphery and thereby together defining a light curtain therewithin.

Impingement of an object, such as a stylus or finger 120, upon support 104 preferably is sensed by one or more light detectors 122, preferably disposed along an edge of detection region 105 along which the optical illumination assembly 102 does not extend. The detectors detect changes in the light received from the optical illumination assembly 102 produced by the presence of finger 120 in the detection region 105. Preferably, detectors 122 are located in the same plane as the optical illumination assembly 102. Preferably, two detectors are sufficient to detect finger 120 anywhere in the detection region 105, each detector being located at an adjacent corner of the detection region 105 and having at least 90 degree coverage, as shown.

Preferably, detectors 122 are each linear CMOS sensors, such as an RPLIS-2048 linear image sensor commercially available from Panavision SVI, LLC of One Technology Place, Horner, New York, which are suitable for use in triangulation. The outputs of detectors 122 are supplied to detection circuitry 124, such as that described in assignee's U.S. Published Patent Application 2006/0187198 and U.S. Provisional Applications 60/819,891; 60/832,508 and 60/889,746, the disclosures of which are hereby incorporated by reference, which provides an output indication of the two dimensional location of the finger 120 impingement in the detection region 105.

Reference is now made additionally to FIGS. 2A, 2B, 2C and 2D, which are each a simplified, partially sectional, partially pictorial illustration of a portion of an optical assembly useful in the touch screen of FIG. 1.

Figure 2A:
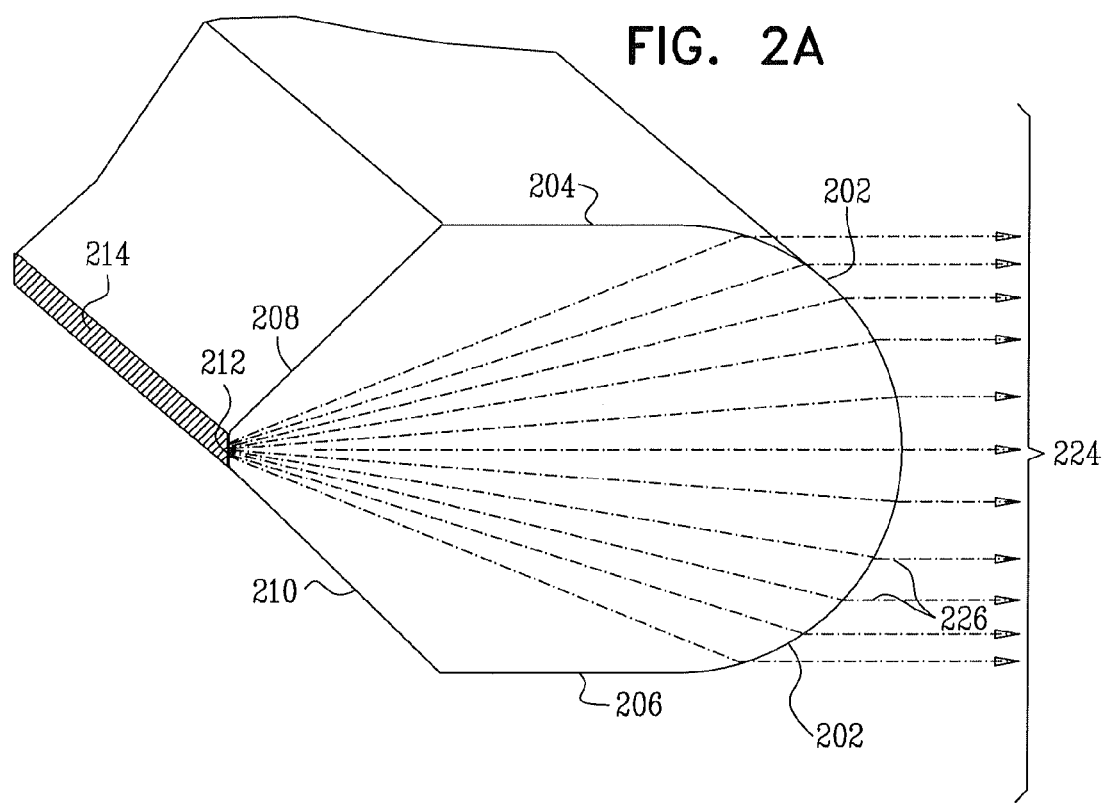
FIGS. 2A, 2B, 2C and 2D are each a simplified, partially sectional, partially pictorial illustration of a portion of an optical assembly useful in the touch screen of FIG. 1.

FIG. 2A illustrates the use of a light guide 200 having an aspheric cross sectional configuration and at least one light scatterer located precisely at a focus of a light transmissive region thereof. The cross section of light guide 200, as shown in FIG. 2A, preferably includes a light transmissive curved forward portion 202 having optical power, generally parallel intermediate portions 204 and 206 and tapering rearward portions 208 and 210 which meet at a relatively narrow rearward strip portion 212. Preferably strip portion 212 is coated with a layer 214 of light scattering white paint along all or most of its extent. It is appreciated that the light guide 200 may be formed by any suitable manufacturing technique, such as extrusion.

Curved forward portion 202 lies generally opposite strip portion 212 and acts generally to collimate the light scattered by layer 214, as shown, in a plane 224 extending in a direction, indicated by arrows 226, away from the layer 214.

Figure 2B:
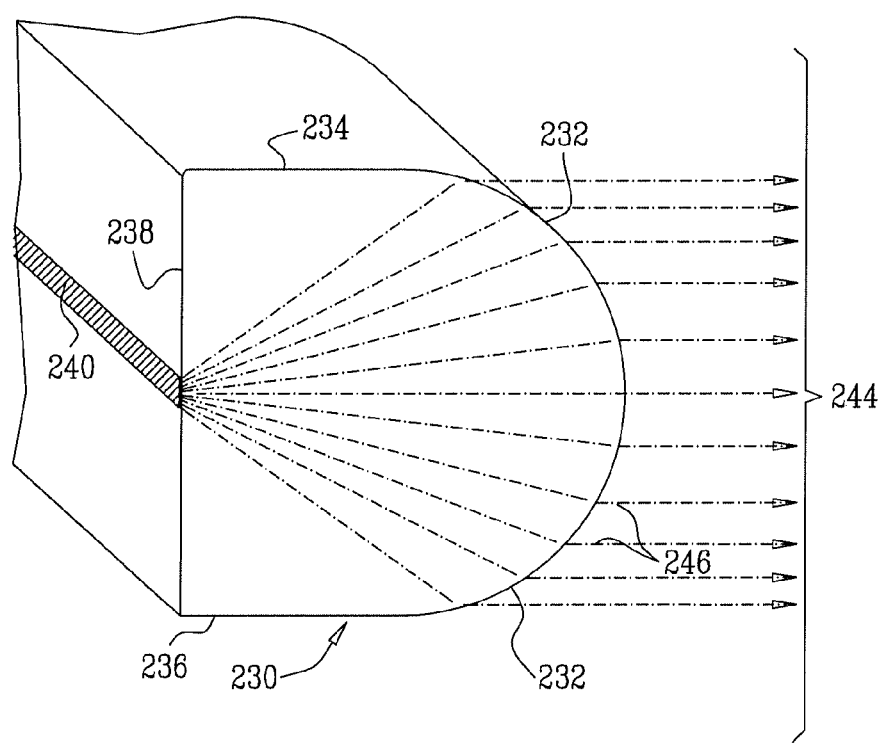

FIG. 2B illustrates the use of an alternative example of a light guide 230 having an aspheric cross sectional configuration and at least one light scatterer located precisely at a focus of a light transmissive region thereof. The cross section of light guide 230, as shown in FIG. 2B, preferably includes a light transmissive curved forward portion 232 having optical power, generally parallel intermediate portions 234 and 236 and a rear portion 238 having formed thereon a relatively narrow layer 240 of light scattering white paint along all or most of its extent. It is appreciated that the light guide 230 may be formed by any suitable manufacturing technique, such as extrusion.

Curved forward portion 232 lies generally opposite layer 240 and acts generally to collimate the light scattered by layer 240, as shown, in a plane 244 extending in a direction, indicated by arrows 246, away from the layer 240.

Figure 2C:
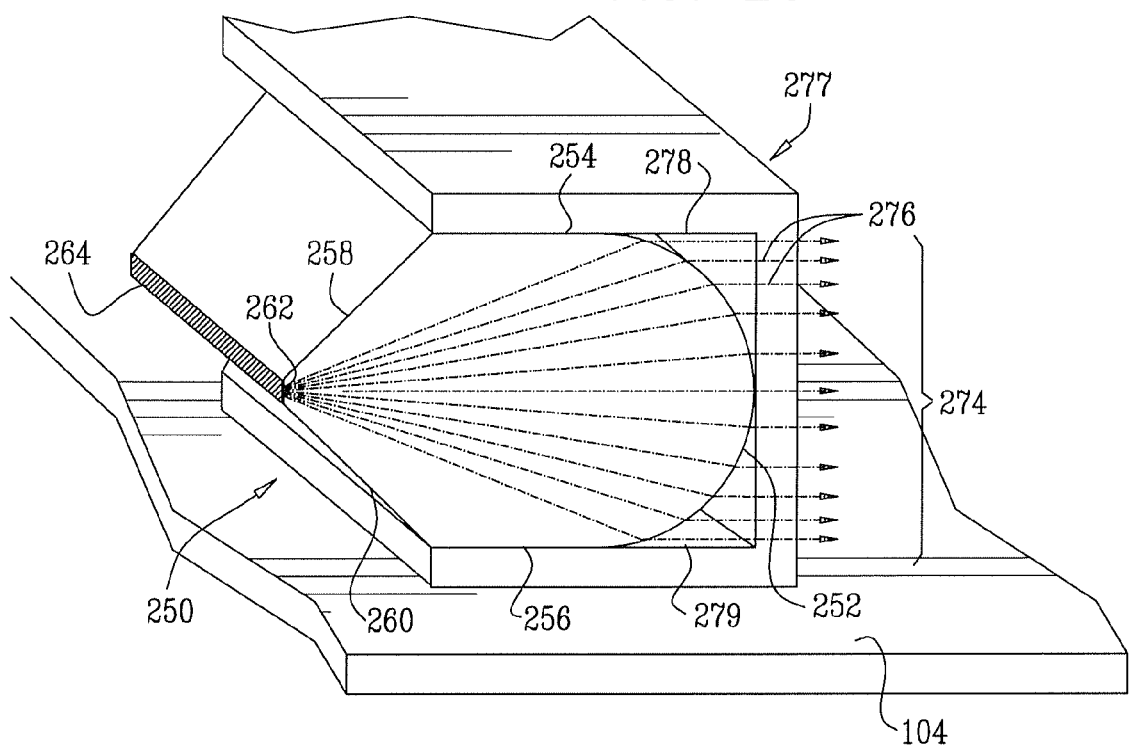

FIG. 2C illustrates the use of a light guide 250, similar to light guide 200 and having an aspheric cross sectional configuration and at least one light scatterer located precisely at a focus of a light transmissive region thereof. The cross section of light guide 250, as shown in FIG. 2C, preferably includes a light transmissive curved forward portion 252 having optical power, generally parallel intermediate portions 254 and 256 and tapering rearward portions 258 and 260 which meet at a relatively narrow rearward strip portion 262. Preferably strip portion 262 is coated with a layer 264 of light scattering white paint along all or most of its extent. It is appreciated that the light guide 250 may be formed by any suitable manufacturing technique, such as extrusion.

Curved forward portion 252 lies generally opposite strip portion 262 and acts generally to collimate the light scattered by layer 264, as shown, in a plane 274 extending in a direction, indicated by arrows 276, away from the layer 264.

In accordance with a preferred embodiment of the present invention, light guide 250 is retained within an elongate transparent mounting and window defining member 277, preferably having a U-shaped cross section. Member 277 is typically fixed to a support such as support 104 (FIG. 1). The structure of FIG. 2C ensures correct alignment of the light guide 250 relative to support 104 such that the collimated scattered light designated by reference numeral 118 in FIG. 1 is directed generally parallel to support 104. This alignment is enhanced by the engagement of parallel surfaces defined by intermediate portions 254 and 256 with corresponding parallel surfaces 278 and 279 of member 277. Additionally, the structure of FIG. 2C minimizes light loss from light guide 250 which would otherwise occur due to optical coupling due to adhesive bonding or other types of mounting of light guide 250 on support 104. Member 277 is particularly useful in an optical touch screen structure inasmuch as it provides peripheral sealing of the touch screen.

Figure 2D:
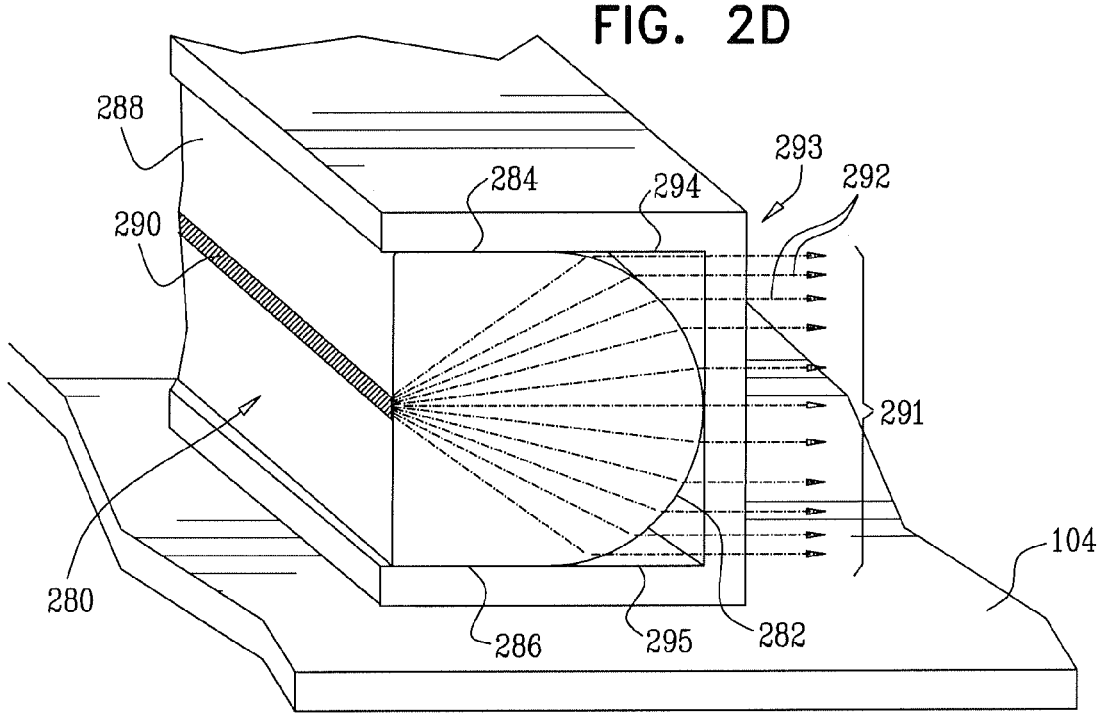

FIG. 2D illustrates the use of an alternative example of a light guide 280 having an aspheric cross sectional configuration and at least one light scatterer located precisely at a focus of a light transmissive region thereof. The cross section of light guide 280, as shown in FIG. 2D, preferably includes a light transmissive curved forward portion 282 having optical power, generally parallel intermediate portions 284 and 286 and a rear portion 288 having formed thereon a relatively narrow layer 290 of light scattering white paint along all or most of its extent. It is appreciated that the light guide 280 may be formed by any suitable manufacturing technique, such as extrusion.

Curved forward portion 282 lies generally opposite layer 290 and acts generally to collimate the light scattered by layer 290, as shown, in a plane 291 extending in a direction, indicated by arrows 292, away from the layer 290.

In accordance with a preferred embodiment of the present invention, light guide 280 is retained within an elongate transparent mounting and window defining member 293, preferably having a U-shaped cross section. Member 293 is typically fixed to a support such as support 104 (FIG. 1). The structure of FIG. 2D ensures correct alignment of the light guide 280 relative to support 104 such that the collimated scattered light designated by reference numeral 118 in FIG. 1 is directed generally parallel to support 104. This alignment is enhanced by the engagement of parallel surfaces defined by intermediate portions 284 and 286 with corresponding parallel surfaces 294 and 295 of member 293. Additionally, the structure of FIG. 2D minimizes light loss from light guide 280 which would otherwise occur due to optical coupling due to adhesive bonding or other types of mounting of light guide 280 on support 104. Member 293 is particularly useful in an optical touch screen structure inasmuch as it provides peripheral sealing of the touch screen.

Due to the cross-sectional configuration of the optical light guides 200, 230, 250 and 280, wherein the light scatterers are located precisely at the respective foci of the light transmissive forward portions having optical power, a light curtain of highly uniform thickness may be realized.

Figure 3:
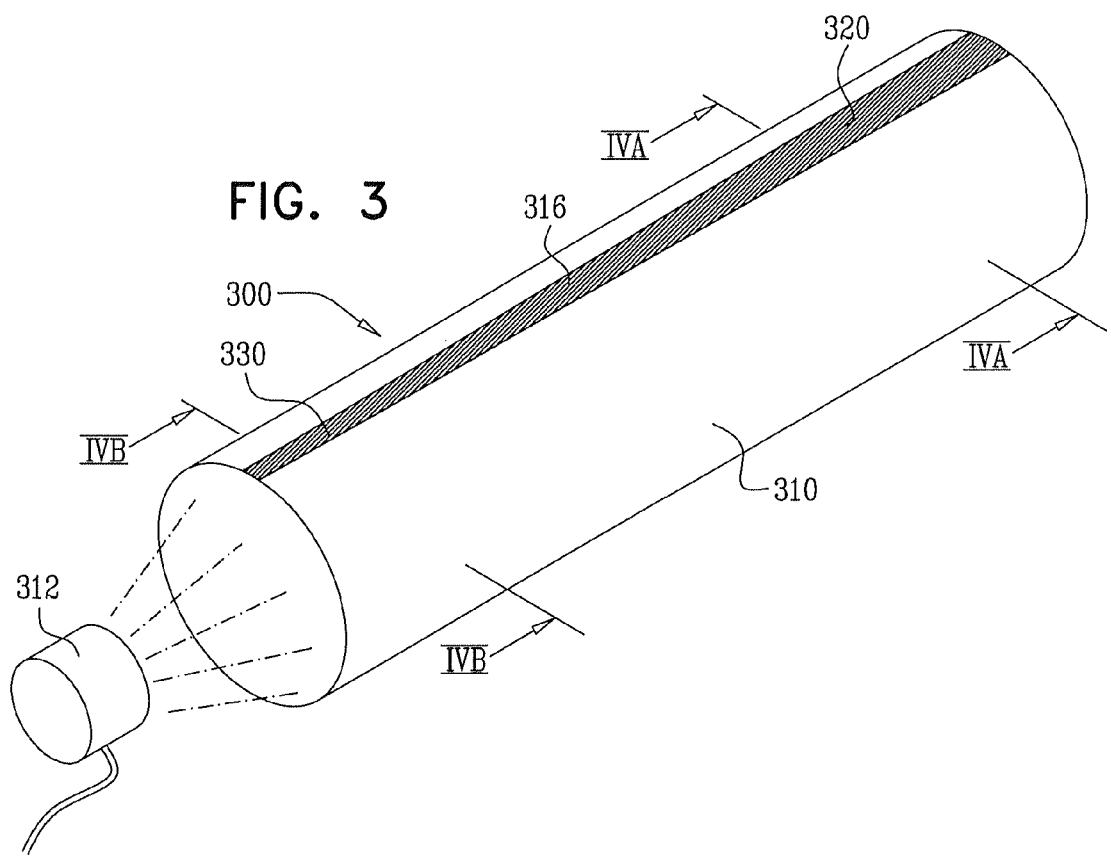
FIG. 3 is a simplified illustration of an optical assembly structure useful in the touch screen of FIG. 1 and providing attenuation compensation.
Figure 4A:
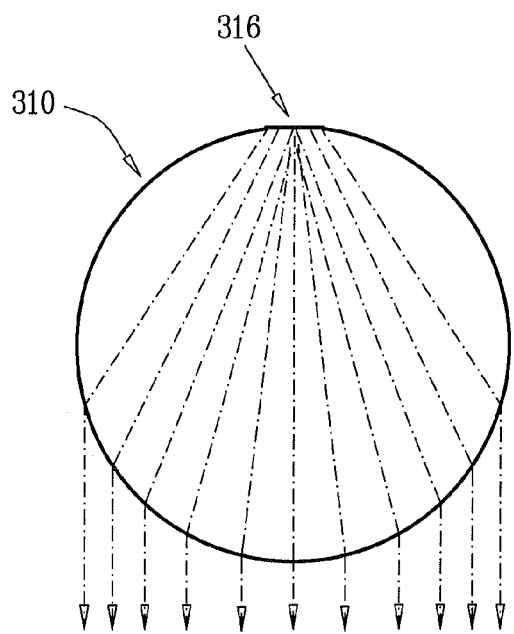
FIGS. 4A and 4B are simplified sectional illustrations of the optical assembly structure of FIG. 3, taken along respective lines IVA-IVA and IVB-IVB.
Figure 4B:
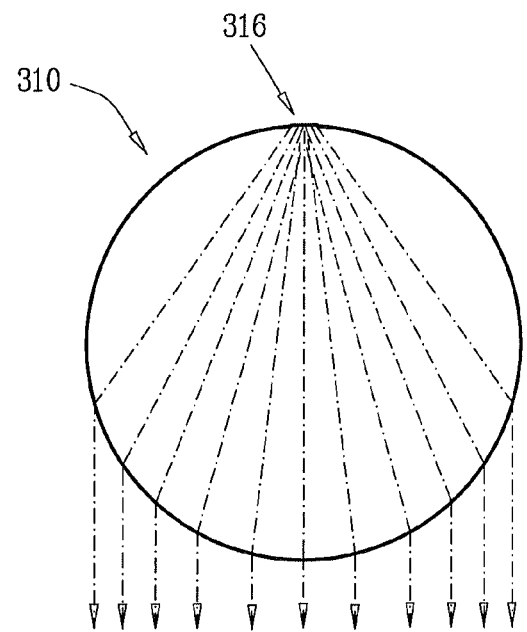

Reference is now made to FIGS. 3, 4A and 4B, which are simplified illustrations of an optical assembly structure 300 useful in the apparatus of FIG. 1 and providing attenuation compensation. A light guide 310 is associated at one end thereof with a light source 312. One or more light scatterers 316 are formed in the light guide 310, as generally described hereinabove. It is seen in FIG. 3 that the light scatterer 316 may have different depth or width at differing locations along the light guide 310. For example, a portion 320, shown in FIG. 4A, of light scatterer 316 at a location relatively far from the light source 312 is seen to be of greater width and depth than a portion 330, shown in FIG. 4B, of light scatterer 316 at a location relatively close to the light source 312.

The result of the variation in the light scatterers over the length of the light guide 310 is that attenuation of light traveling along the light guide 310 from the light source 312 at an end of the light guide 310 is compensated such that a generally uniform level of illumination is produced along the length of the illuminating region of the optical illumination assembly structure 300.

It will be appreciated by persons skilled in the art that the present invention is not limited by what has been particularly shown and described hereinabove. Rather the scope of the present invention includes both combinations and subcombinations of features recited in the claims as well as modifications thereof which would occur to a person of ordinary skill in the art upon reading the foregoing and which are not in the prior art.

The invention claimed is:

1. An optical touch panel comprising:
a support defining a generally planar surface;
an optical illumination assembly arranged along and above at least part of a periphery of said support to define a detection region, said assembly including:
at least one light guide, said at least one light guide having at least one light scatterer, said at least one light guide having optical power at least one surface having a focus located in proximity to said light scatterer;
wherein said at least one light guide extends along at least three sides of said detection region; and
at least one light source arranged for directing light along said at least one light guide, said optical power of said at least one light guide and said at least one light scatterer being operative to direct light, received from said at least one light source along said at least one light guide and scattered by said at least one light scatterer, generally in a plane parallel to said generally planar surface; at least one light detector, arranged to detect changes in the light received from said optical illumination assembly produced by the presence of an object in said detection region; and detection circuitry receiving at least one output from said at least one light detector and providing an output indication of the two dimensional location of object impingement in said detection region.

2. An optical touch panel according to claim 1 and wherein said at least one light guide extends along at least most of a periphery of a light curtain area parallel to said generally planer surface and said at least one light scatterer extends along said periphery of said light curtain area, providing a generally uniform distribution of light in said plane, filling the interior of said periphery of said light curtain area and thereby defining a light curtain therewithin.

3. An optical touch panel according to claim 2 and also comprising at least one light curtain impingement sensor operative to sense impingement of said light curtain and to produce impingement output signals including two-dimensional impingement location information and output signal processing circuitry for providing an output indication of a two-dimensional impingement location.

4. An optical touch panel according to claim 1 and wherein:
said at least one light guide includes a single light guide; and
said at least one light source comprises two light sources, a single light source being placed at each end of said single light guide.

5. An optical touch panel according to claim 1 and wherein said at least one light source is located only at a corner of said periphery of said detection region.

6. An optical touch panel according to claim 1 and wherein light scattering functionality of said at least one light scatterer varies along the length of said at least one light guide to provide compensation for attenuation produced by said light guide.

7. An optical touch panel according to claim 1 and wherein said detection circuitry operates at least partially by triangulation.

8. An optical touch panel according to claim 1 and wherein said at least one light guide extends along three sides of said detection region, said at least one detector comprises a pair of detectors located at adjacent corners of said detection region alongside ends of said at least one light guide and wherein said detection circuitry operates at least partially by triangulation.

9. An optical touch panel according to claim 1 and wherein said at least one light guide has a non-spherical cross section and said at least one light scatterer is located precisely at a focus of said at least one surface.

10. An optical touch panel according to claim 9 and wherein said non-spherical cross section includes a curved forward portion having optical power.

11. An optical touch panel according to claim 10 and wherein said non-spherical cross section includes generally parallel intermediate portions.

12. An optical touch panel according to claim 11 and wherein said non-spherical cross section includes tapering rearward portions which meet at a relatively narrow rearward strip portion.

13. An optical touch panel according to claim 11 and also comprising an elongate transparent mounting and window defining guide fixed to said support, said elongate transparent mounting and window defining guide having a U-shaped cross section comprising parallel surfaces and wherein said parallel surfaces engage said generally parallel intermediate portions.

14. An optical touch panel according to claim 1 and wherein said at least one light scatterer includes a layer of light scattering paint.

15. An optical touch panel according to claim 1 and also comprising an elongate transparent mounting and window defining guide fixed to said support.

16. An optical touch panel according to claim 15 and wherein said elongate transparent mounting and window defining guide is operative to ensure correct alignment of said optical illumination assembly relative to said support.

17. An optical touch panel according to claim 15 and wherein said elongate transparent mounting and window defining guide has a U-shaped cross section.

18. An optical touch panel according to claim 15 and wherein said elongate transparent mounting and window defining guide is operative to minimize light loss from said at least one light guide.

* * * * *